(12) United States Patent
Jeppesen et al.

(10) Patent No.: US 7,000,095 B2
(45) Date of Patent: Feb. 14, 2006

(54) METHOD AND APPARATUS FOR CLEARING HAZARDS USING JUMP INSTRUCTIONS

(75) Inventors: Niels Gram Jeppesen, Gentofte (DK); G. Michael Uhler, Menlo Park, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 474 days.

(21) Appl. No.: 10/238,993

(22) Filed: Sep. 6, 2002

(65) Prior Publication Data

US 2004/0049660 A1    Mar. 11, 2004

(51) Int. Cl.
G06F 9/30 (2006.01)
G06F 9/40 (2006.01)

(52) U.S. Cl. .................. 712/219; 712/215; 712/233
(58) Field of Classification Search ............ 712/217, 712/219, 226, 238, 239, 245, 215, 233
See application file for complete search history.

(56) References Cited

U.S. PATENT DOCUMENTS

| | | | | |
|---|---|---|---|---|
| 4,974,155 A | * | 11/1990 | Dulong et al. ............. | 712/219 |
| 5,537,560 A | * | 7/1996 | Boggs et al. .............. | 712/245 |
| 5,579,498 A | | 11/1996 | Ooi | |
| 5,761,473 A | | 6/1998 | Kahle et al. | |
| 5,805,878 A | * | 9/1998 | Rahman et al. ............ | 712/239 |
| 5,809,275 A | | 9/1998 | Lesartre | |
| 5,809,294 A | * | 9/1998 | Ando ......................... | 712/233 |
| 5,848,269 A | * | 12/1998 | Hara .......................... | 712/239 |
| 5,850,552 A | | 12/1998 | Odani et al. | |
| 5,889,974 A | | 3/1999 | Harriman et al. | |
| 6,260,189 B1 | | 7/2001 | Batten et al. | |
| 6,643,767 B1 | * | 11/2003 | Sato .......................... | 712/219 |
| 2002/0069348 A1 | | 6/2002 | Roth et al. | |

FOREIGN PATENT DOCUMENTS

WO    WO 00/70483    11/2000

OTHER PUBLICATIONS

IBM, PowerPC Microprocessor Family: The Programming Environments for 32-Bit Microprocessors, Feb. 21, 2000, Section 4.3.2, 5.1.5.2.2, p. 8-94 (isync).
Compaq Computer Corporation, Alpha Architecture Handbook, Version 4, 6.7.3, p. 6-8.

* cited by examiner

*Primary Examiner*—Daniel H. Pan
(74) *Attorney, Agent, or Firm*—James W. Huffman; James Kurkowski

(57) ABSTRACT

A method and apparatus for overlaying hazard clearing with a jump instruction within a pipeline microprocessor is described. The apparatus includes hazard logic to detect when a jump instruction specifies that hazards are to be cleared as part of a jump operation. If hazards are to be cleared, the hazard logic disables branch prediction for the jump instruction, thereby causing the jump instruction to proceed down the pipeline until it is finally resolved, and flushing the pipeline behind the jump instruction. Disabling of branch prediction for the jump instruction effectively clears all execution and/or instruction hazards that preceded the jump instruction. Alternatively, hazard logic causes issue control logic to stall the jump instruction for n-cycles until all hazards are cleared. State tracking logic may be provided to determine whether any instructions are executing in the pipeline that create hazards. If so, hazard logic performs normally. If not, state tracking logic disables the effect of the hazard logic.

20 Claims, 5 Drawing Sheets

Figure 4

EXECUTION HAZARDS /400

| Producer → | Consumer | Hazard On |
|---|---|---|
| TLBWR,TLBWI → | TLBP,TLBR | TLB entry |
| | Load/store using new TLB entry | TLB entry |
| MTC0 → | Load/store affect by new state | $EntryHi_{ASID}$<br>WatchHi<br>WatchLo |
| MTC0 → | Coprocessor instruction execution depends on the new value of $Status_{CU}$ | $Status_{CU}$ |
| MTC0 → | ERET | Status<br>EPC<br>DEPC<br>ErrorEPC |
| MTC0,EI,DI → | Interrupted Instruction | $Status_{IE}$ |
| MTC0 → | Interrupted Instruction | $Cause_{IP}$ |
| TLBR → | MFC0 | EntryHi<br>EntryLo0<br>EntryLo1<br>PageMask |
| TLBP → | MFC0 | Index |
| MTC0 → | TLBR<br>TLBWI<br>TLBWR | EntryHi |
| MTC0 → | TLBP<br>Load or Store Instruction | $EntryHi_{ASID}$ |
| MTC0 → | RDPGPR<br>WRPGPR | $SRSCtl_{PSS}$ |

Figure 5

INSTRUCTION HAZARDS /500

| Producer → | Consumer | Hazard On |
|---|---|---|
| TLBWR,TLBWI → | Instruction fetch using new TLB entry | TLB entry |
| MTC0 → | Instruction fetch seeing the new value (including a change to ERL followed by an instruction fetch from the useg segment) | Status |
| MTC0 → | Instruction fetch seeing the new value | $EntryHi_{ASID}$<br>WatchHi<br>WatchLo |
| Instruction stream writes → | Instruction fetch seeing the new instruction stream | Cache entries |

*Figure 6* / 600
Jump and Link Register with Hazard Barrier      JALR.HB
| SPECIAL 000000 | rt | 0 00000 | rd | 1 | Any other legal hint value | JALR |
|---|---|---|---|---|---|---|
| 6 | 5 | 5 | 5 | 1 | 4 | 6 |
31    26 25    21 20    16 15    11 10 9    6 5    0
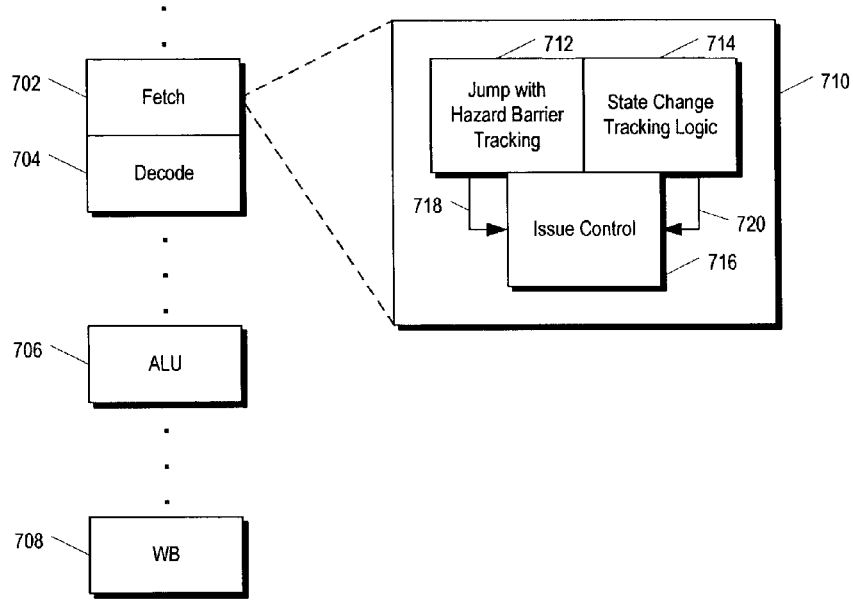
*Figure 7* / 700

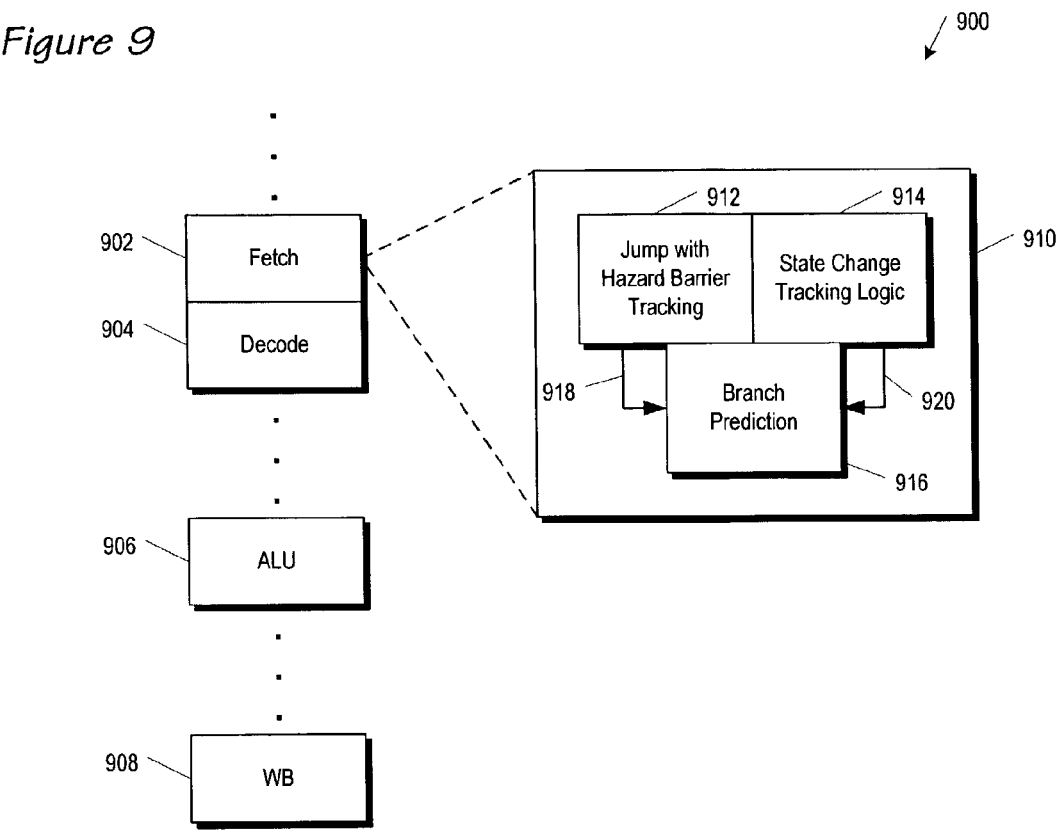

METHOD AND APPARATUS FOR CLEARING HAZARDS USING JUMP INSTRUCTIONS

FIELD OF THE INVENTION

This invention relates in general to the field of computer architecture, and more specifically to a method and apparatus for managing instruction hazards within a pipeline architecture by overlaying hazard clearing with jump instructions.

BACKGROUND OF THE INVENTION

Referring to FIG. 1, a block diagram is shown of a four stage Single-Completion Instruction Pipeline of an early microprocessor 100. The pipeline stages include: 1) Fetch; 2) Arithmetic operation (ALU); 3) Memory access; and 4) Write back. In operation, the microprocessor fetches an instruction for execution in cycle 1, executes the instruction in cycle 2, performs a read or write to memory in cycle 3, and writes the result of the ALU operation (from cycle 2), or the memory read (from cycle 3), into its register file in cycle 4. If each pipeline stage requires one processor clock to complete its function, then in the four stage pipeline, an instruction requires four clocks to complete execution. In this example, the execution rate of the pipeline is one instruction every four clock cycles.

One skilled in the art of microprocessor design will recognize that one of the problems in the Single-Completion Instruction Pipeline of FIG. 1 is that in any given clock cycle, only one of the pipeline stages is being utilized for instruction execution. For example, during clock cycle 1, the Fetch stage is busy fetching an instruction for execution, but the ALU, Memory and Write stages are essentially idle. An idle processing stage is considered inefficient and therefore undesirable within a processing system.

A remedy for the idleness described above is shown in FIG. 2, to which attention is now directed. FIG. 2 includes a four stage pipeline microprocessor 200 similar to the one shown in FIG. 1. However, in the microprocessor 200, rather than waiting for an instruction to be completed before the next instruction can be fetched (four clock cycles), a new instruction is fetched each clock cycle. In this four stage pipeline, four instructions are in the process of executing simultaneously, one at each stage of the pipeline. While it still takes four clock cycles for the first instruction to be completed, a new instruction is completed every clock cycle thereafter. Thus, the idleness illustrated in FIG. 1 above has been removed, and the overall processing efficiency has been improved.

A problem is created however, in the parallel pipeline of FIG. 2, when an instruction depends on the completion or resolution of a previous instruction before it can begin. This problem is illustrated in FIG. 3 to which attention is now directed.

FIG. 3 illustrates a parallel pipeline microprocessor 300 such as the one shown in FIG. 2. However, in this Figure, Instruction 2 is dependent on the resolution of Instruction 1 before it can begin. For example, presume Instruction 1 is of the form: LOAD REG1, MEM. That is, Instruction 1 causes a value from memory location MEM to be retrieved from memory, and stored within a register REG1 within the microprocessor 300. Now, presume that Instruction 2 is of the form: ADD REG1,2. That is, Instruction 2 adds the contents of the REG1 register to the numeric value 2, and stores the result in the REG1 register. In the four stage pipeline 300, Instruction 1 does not retrieve the contents of memory location MEM until the end of clock cycle 3. And, the retrieved contents of memory location MEM are not stored into the register REG1 until the end of clock cycle 4. If Instruction 2 were allowed to proceed into the ALU stage of the pipeline in clock cycle 3, the contents of the REG1 register, to which the value of 2 is to be added, would not yet be updated with the contents from MEM. Thus, the result of the addition would either be unknown, or at the very least incorrect. In this example, the only way to make sure that Instruction 2 is executed using the correct contents of register REG1 is to hold or stall execution of Instruction 2 by at least two clock cycles.

What is shown in FIG. 3 is just one example of what is known as a pipeline hazard. In general, there are two types of pipeline hazards: 1) execution hazards; and 2) instructions hazards. Execution hazards are hazards created by the execution of one instruction, and seen by the execution of another instruction, such as shown in FIG. 3. Instruction hazards are those created by the execution of one instruction, and seen by the instruction fetch of another instruction. For example, a first instruction might update a TLB entry in a TLB table, and a second instruction would fetch an instruction using the updated TLB entry. If the second instruction attempted to fetch an instruction from the TLB entry prior to the update, it would be fetching an incorrect instruction. In either case, to insure that all instructions execute properly within a pipelined microprocessor, it must be assured that an instruction that depends on the resolution of a previous instruction is either stalled or delayed, at least until the instruction from which it depends completes. The methodology utilized to insure proper execution of dependent instructions is known as hazard protection, or hazard clearing.

Hazard protection is typically performed either in hardware, or in software. When hazard protection is provided in hardware, a portion of the microprocessor is dedicated to tracking each instruction to be executed for the purpose of detecting instruction dependencies. When an instruction dependency is detected, the hardware causes an interlock on the dependent instruction, thereby stalling the dependent instruction, until the instruction from which it depends completes execution. A benefit of designing a microprocessor to incorporate hardware hazard protection is that a software programmer is shielded from the intricacies associated with instruction execution. That is, the programmer does not have to worry about how many stages it takes for a first instruction to be resolved before starting a second dependent instruction. S/he can simply write the instructions in the order desired for execution, and trust that the hazard hardware in the microprocessor will insure proper execution. A downside of providing hazard protection in hardware is that such hardware adds considerable complexity to the microprocessor, and that impacts both the design cost and ultimate cost of the microprocessor. In addition, design changes in the architecture that effect execution order, the number of stages in the pipeline, or execution timing, must be considered in the hazard hardware, thereby making design changes in the hazard hardware necessary. For many types of microprocessors, the additional complexity associated with providing hazard protection in hardware is considered inappropriate. For these microprocessors, hazard protection is typically provided via software.

Software hazard protection places the burden of preventing hazards on the software programmer, or on the designer of the compiler used by the software programmer. To illustrate how a software programmer would resolve the hazard shown in FIG. 3, consider the following program:

```
        LOAD    REG1, MEM
                NOP
                NOP
        ADD     REG1, 2
```

A programmer, with knowledge of the pipeline structure of the microprocessor 300 understands that Instruction 2 is dependent on the resolution of Instruction 1, and that it will take two additional clock cycles between Instructions 1 and 2 to resolve the dependency. S/he therefore inserts two NOP (no operation) instructions in between Instructions 1 and 2. Alternatively, if the programmer utilized a compiler that was designed specifically for the microprocessor 300, s/he could trust that the compiler would detect the dependency between Instructions 1 and 2, and would insert the necessary number of NOP instructions between the two instructions. From the viewpoint of the microprocessor 300, it is simply fetching an instruction every clock cycle and passing the fetched instructions down the pipeline for execution. The microprocessor 300 has not needed any additional hardware to resolve the hazard, and yet the hazard has been prevented.

A problem with software hazard clearing is that it places the burden of understanding the nuances of instruction execution within a particular microprocessor implementation on either the programmer, or alternatively on the designer of the compiler for the microprocessor. While such a burden is ubiquitous within the field of modern microprocessors, it is nonetheless a significant problem. Not only must a programmer understand the implementation of the processor for which s/he is coding, s/he must also understand how much delay is associated with each instruction upon which other instructions depend. Within a deeply pipelined microprocessor (12 or more stages), the programmer must insert between 1 and 10 NOP's between dependent instructions, depending on how far the dependent instructions are separated within the program, and depending on how far the first instruction must proceed in the pipeline before it is resolved. To accurately code for a deeply pipelined microprocessor, a programmer must be very proficient in the implementation hazards of the processor.

An additional problem with using software hazard clearing is that once a program is developed for a microprocessor, it is unlikely that the program will operate on subsequent generations of the microprocessor without a significant rewrite of the program. For example, if a microprocessor advances from having a five stage pipeline, to having a twelve stage pipeline, it is unlikely that any of the hazard clearing methods used for the five stage pipeline will operate correctly in the twelve stage pipeline. This is true even though the software architectures (i.e., the instructions) of the five and twelve stage pipeline are identical.

What has become apparent to the inventors of the present invention is the need for a hazard clearing mechanism that can be utilized by programmers, or designers of compilers, that can be implemented across multiple generations of a microprocessor architecture, that eliminates the need of rewriting hazard clearing code between processor generations, and that eases the burden on the programmer of understanding the nuances of particular microprocessor hazards.

What is also needed is a method and apparatus that allows a programmer to specify when a hazard should be cleared, without regard to the number of stages between the hazard and the dependent instruction.

Further what is needed is a method and apparatus for hazard clearing that can be utilized in conjunction with hardware hazard tracking.

SUMMARY

The present invention provides a method and apparatus for overlaying hazard clearing with a jump operation.

In one aspect, the present invention provides a pipelined microprocessor for executing an instruction to clear instruction hazards in conjunction with performing a jump. The pipelined microprocessor includes issue control and jump with hazard barrier tracking logic. The issue control issues instructions to be executed by the pipelined microprocessor and has the ability to stall issuance of instructions for n-cycles upon receipt of a stall indication signal. The jump with hazard barrier tracking logic is coupled to the issue control and detects when the instruction to clear instruction hazards in conjunction with performing a jump is to be executed. When it is, it provides the stall indication signal to the issue control.

In another aspect, the present invention provides a pipelined microprocessor having hazard clearing logic. The pipelined microprocessor includes branch prediction logic and jump with hazard barrier tracking logic. The branch prediction logic predicts a branch target address that causes the pipelined microprocessor to jump to the predicted target address prior to the jump instruction completing execution. The jump with hazard barrier tracking logic is coupled to the branch prediction logic and detects when the jump instruction indicates that hazards are to be cleared. When the jump instruction indicates that hazards are to be cleared, the tracking logic signals the branch prediction logic to disable branch prediction for the jump instruction.

In another aspect, both of the above apparatuses further include state change tracking logic to determine whether instructions are executing within the pipeline microprocessor that produce instruction hazards. If no instructions are executing that produce instruction hazards, the effect of the hazard tracking logic is negated.

In a further aspect, the present invention provides a jump with hazard barrier instruction for execution on a pipelined microprocessor. The jump with hazard barrier instruction includes an opcode field, a register field, and a hazard barrier hint field. The opcode field specifies a jump to a target address operation. The register field, specifies a register that contains a value used to determine the target address. The hazard barrier hint field designates that instruction hazards are to be cleared as part of execution of the jump instruction.

In yet another aspect, the present invention provides a method for clearing instruction hazards within a pipelined microprocessor in conjunction with performing a jump operation. The method includes: determining whether a jump operation is to be performed; and if so, determining whether the jump operation specifies whether instruction hazards are to be cleared; and if so, clearing the instruction hazards as part of the jump operation. The method may include detecting whether any instructions are executing within the pipelined microprocessor that create instruction hazards, and if not, negating the clearing operation.

In another aspect, the present invention provides a computer program product for use with a computing device. The computer program product includes a computer usable medium, having computer readable program code embodied in the medium, to cause a pipelined microprocessor having a hazard clearing mechanism to be provided. The computer readable program code includes: first program code for providing issue control logic for issuing instructions to be executed by the pipelined microprocessor, the issue control stalling issuance of instructions for n-cycles upon receipt of a stall indication signal; and second program code for providing jump with hazard barrier tracking logic, coupled to the issue control, for detecting when an instruction to clear instruction hazards in conjunction with performing a jump is to be executed, and when it is, for providing the stall indication signal to the issue control.

In a further aspect, the present invention provides a computer data signal embodied in a transmission medium that includes computer-readable program code for providing a pipelined microprocessor having hazard clearing logic. The program code includes: first program code for providing branch prediction logic, for predicting a target address and for causing the pipelined microprocessor to jump to the predicted target address, prior to the jump instruction completing execution; and second program code for providing jump with hazard barrier tracking logic, coupled to the branch prediction logic, for detecting when the jump instruction indicates that hazards are to be cleared, and when the jump instruction indicates that hazards are to be cleared, for signaling the branch prediction logic to disable branch prediction for the jump instruction.

Other features and advantages of the present invention will become apparent upon study of the remaining portions of the specification and drawings.

BRIEF DESCRIPTION OF THE DRAWINGS

FIG. 4 is a table listing instruction hazards within a MIPS32 architecture.

FIG. 5 is a table listing instruction hazards within a MIPS32 architecture.

FIG. 6 is a jump instruction within the MIPS32 architecture that is overlaid with a hazard clearing indicator.

FIG. 7 is a block diagram of a pipelined microprocessor incorporating the hazard clearing mechanism according to an embodiment of the present invention.

FIG. 9 is a block diagram of a pipelined microprocessor incorporating the hazard clearing mechanism according to an alternative embodiment of the present invention.

FIG. 10 is another jump instruction within the MIPS32 architecture that is overlaid with a hazard clearing indicator.

DETAILED DESCRIPTION

Figure 1:
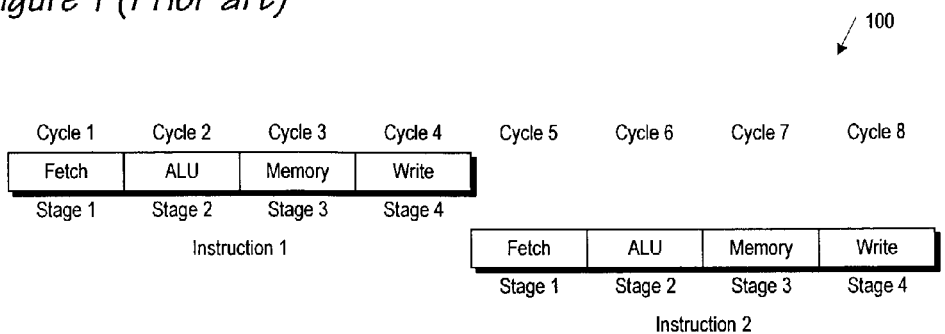
FIG. 1 is prior art block diagram of a four stage pipeline microprocessor.
Figure 2:
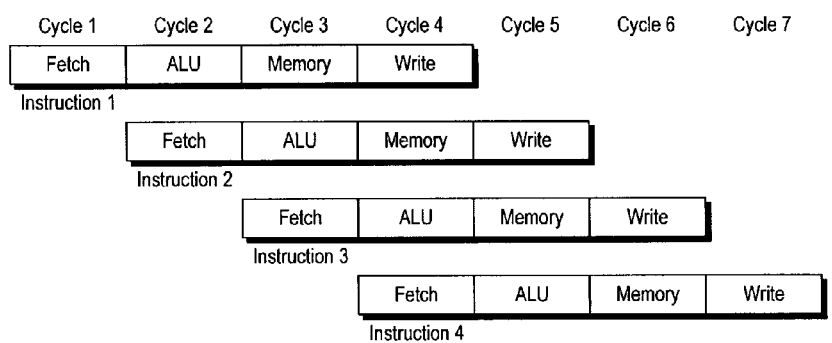
FIG. 2 is a prior art block diagram of a parallel pipeline microprocessor.
Figure 3:
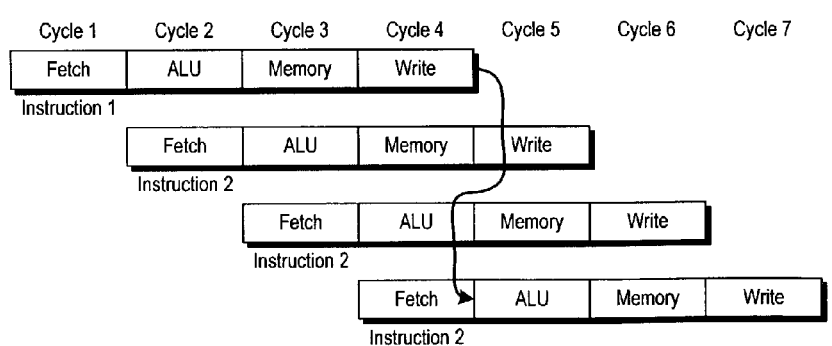
FIG. 3 is a prior art block diagram of a parallel pipeline microprocessor executing an instruction sequence having an instruction hazard.

While the below described invention has utility within many different pipelined microprocessors, so that the idea will be better understood, it will be particularly described as it will be embodied within the MIPS32 Architecture by MIPS Technologies, Inc. of Mountain View, Calif. More specifically, the invention adds explicit hazard clearing instructions to the MIPS32 Architecture. The hazard clearing instructions are overlaid on top of existing call and return instructions, while particularly specifying when hazards should be cleared. Execution logic within the microprocessor detects when calls and returns are concerned with hazards and acts to effectively clear the hazards when the concern is noted. The instructions, being part of the architecture of the processor, effect hazard clearing within multiple generations of the architecture, without requiring the programmer to either understand the nuances of the processor with respect to hazards, and without inserting a predetermined number of NOPs.

Before presenting the new hazard clearing instructions, an overview is first provided of the types of hazards that occur within the MIPS32 architecture.

Execution Hazards

Execution hazards are those created by the execution of one instruction, and seen by the execution of another instruction. FIG. 4 provides a list of execution hazards within the MIPS32 architecture. The "Producer" is an instruction within a program that when executed, creates a hazard for a following instruction—the "Consumer". For a complete description of each of the instructions listed, the reader is referred to the MIPS32 Architecture for Programmers Volume II: The MIPS32 Instruction Set, available at www.mips.com. One skilled in the art will appreciate that most of the execution hazards are created when a move to/from CoProcessor 0 (the portion of the MIPS processor that supports a virtual memory system, handles exceptions, etc.) is made.

Instruction Hazards

Instruction hazards are those created by the execution of one instruction, and seen by the instruction fetch of another instruction. FIG. 5 provides a list of instruction hazards within the MIPS32 architecture. A description of these instructions may also be found in the MIPS32 Architecture for Programmers Volume II: The MIPS32 Instruction Set.

Hazard Barrier Jump Instructions

In MIPS32 architecture microprocessors, programmers have been required to insert NOP (SSNOP) instructions between a producer instruction and a consumer instruction, such as those listed in FIGS. 4 and 5 to overcome hazards between the instructions. And, the number of NOPs required depended, as described in the Background above, on the number of stages in the microprocessor, on the spacing between the Producer and Consumer, and on the stage in which the Producer instruction was resolved.

Referring now to FIG. 6, a first new instruction, JALR.HB 600 is introduced which overlays a hazard clearing indicator with a jump instruction. One skilled in the art will appreciate that for the purposes of this invention, branches and jumps are equivalent in terms of the implications of this instruction. This new 32-bit instruction will now be described.

The JALR.HB instruction is encoded using bit 10 of the hint field of the previous JALR instruction. This encoding was chosen for compatibility with existing MIPS implementations, including many which pre-date the MIPS32 architecture. The purpose of the JALR.HB instruction is to execute a procedure call to an instruction address in a register, and to clear all execution and instruction hazards as part of the procedure call. The format of the instruction is JALR.HB rs (rd=31 implied), or JALR.HB rd, rs. When this instruction is executed, the return address (return_addr) is stored in the general purpose register rd, and the value specified in the rs register is stored into the program counter (PC). Within the MIPS32 architecture, the return address is the address of the second instruction following the JAL- R.HB instruction. In addition, with a value of "1" in bit position 10, the JALR.HB instruction also clears all execution and instruction hazards.

More specifically, the JALR.HB instruction implements a software barrier that resolves all execution and instruction hazards created by Coprocessor 0 state changes. The effects of this barrier are seen starting with the instruction fetch and decode of the instruction at the target address to which the JALR.HB instruction jumps.

The JALR.HB instruction, and its effects on hazard clearing, may be implemented in a number of ways. The below discussion provides a description of two embodiments of the invention. In one embodiment, a processor, when seeing the JALR.HB instruction, stalls issue of further instructions for n-cycles until all earlier Coprocessor 0 instructions have completed execution, including update of Coprocessor 0 states that affect the instruction immediately following JALR.HB. The number of cycles that the processor is stalled depends on the length of the pipeline into which the present invention is incorporated. In a second embodiment, the hazard indicator is used to temporarily disable branch prediction mechanisms, instruction fetching, etc., that would otherwise alter sequential program execution. That is, the hazard indicator causes the processor to forego instruction fetching from a predicted target address associated with the jump. Instead, the processor continues its instruction fetching, ultimately flushing the pipeline when the JALR.HB instruction completes execution.

Referring now to FIG. 7, a block diagram is shown of a pipeline microprocessor 700 that incorporates aspects of the hazard clearing invention. The processor 700 includes an N-deep pipeline that includes a fetch stage 702 for fetching instructions, a decode stage 704 for decoding the fetched instructions, an ALU stage 706 for performing logical and arithmetic operations, and a write back stage 708 for writing results either to memory, or to registers within the processor 700. One skilled in the art will appreciate that other stages may exist which either precede the fetch stage 702, or follow the fetch, decode, or ALU stages 702, 704, 706, respectively. The stages shown within the processor 700 are merely representative of some of the stages within modern deeply pipelined microprocessors, as they provide a context for better understanding the present invention.

In one embodiment, hazard clearing logic 710 is located within the fetch stage 702 of the processor 700. Other embodiments might place the hazard clearing logic 710 in other stages of the processor 700, such as after the fetch stage 702. The hazard clearing logic 710 includes: Jump with Hazard Barrier Tracking Logic 712; State Change Tracking logic 714; and Issue Control 716. Operation of the hazard clearing logic 710 is described with reference to the following instruction sequence, particularly the last two instructions of the sequence:

| Opcode | Operands | Comments |
|---|---|---|
| mfc0 | vo,C0__EntryHi | Read current ASID |
| li | vl,-M__EntryHiASID | Get negative mask for field |
| and | vo,vo,v1 | Clear out current ASID value |
| or | vo,vo,a0 | OR in new ASID value |
| mtc0 | vo,C0__EntryHi | Rewrite EntryHi with new ASID |
| jalr.hb | a1 | Call routine, clearing the hazard |
| nop | | |

The above sequence is used to modify ASID within Coprocessor 0, and then call a routine with the new mapping established. The new ASID is stored in register a0 and is used to address the routine to be called.

After the new ASID value replaces the existing ASID value, the instruction MTC0 is fetched into the fetch stage 702 of the processor 700. The MTC0 instruction moves the new value of ASID into a Coprocessor 0 register. While the MTC0 instruction is in the fetch stage 702, the State Change tracking logic 714 detects the MTC0 instruction, and notes that this instruction is of a type that will change the state of the processor 700 in such a way as to create a hazard for a consuming instruction. The stage change tracking logic 714 understands how many cycles it will take for the MTC0 instruction to complete execution, and monitors subsequent clock cycles to "track" the MTC0 instruction until it can mark the instruction as complete. One skilled in the art will appreciate that a number of alternative embodiments may be used to detect and track Producer type instructions through the N-stage pipeline of the processor 700.

During a second clock cycle, the instruction MTC0 proceeds to the next stage in the pipeline, and the instruction JALR.HB is fetched. At this point, the Jump with Hazard Barrier Tracking logic 712 detects this instruction. The Jump with Hazard Barrier Tracking logic is coupled to the State Change Tracking logic to determine whether, at the time the JALR.HB instruction is detected; one or more instructions are still in the pipeline that will affect the state of the processor 700. If so, then the jump with hazard barrier tracking logic 712 (or alternatively the state change tracking logic 714) causes Issue Control logic 716 to stall the JALR.HB instruction until preceding instructions that change the state of the processor 700 have completed. When such instructions complete, the issue control 716 releases the JALR.HB instruction and allows it to proceed down the pipeline, along with the following instructions. If the jump with hazard barrier tracking logic 712 signals the issue control logic 716, it does so by providing a stall indication signal to said issue control using signal line 718. The issue control logic 716 then stalls issuance of the JALR.HB instruction for n-cycles. If the state change tracking logic 714 signals the issue control 716, it does so on signal line 720.

In one embodiment, the issue control 716 automatically stalls the JALR.HB instruction for n-cycles, upon receipt of a stall indication signal. In an alternative embodiment, the issue control 716 only stalls the JALR.HB instruction when it receives both a stall indication signal 718, and a signal from the state change tracking logic on signal line 720. Thus, when the state change tracking logic 714 determines that all hazards have been cleared, it stops signaling the issue control 716, thereby allowing the JALR.HB instruction to proceed. In yet another embodiment, the signal from the state change tracking logic is used to disable the effect of the stall indication signal from the hazard barrier tracking logic 712 when all hazard creating instructions have cleared.

It should be appreciated that without the indication in the JALR.HB instruction to clear any outstanding hazards, the instruction following the nop, presumably the first instruction in the sequence jumped to by the JALR.HB instruction, would execute incorrectly. Alternatively, N-number of NOPs would have had to be placed between the MTC0 instruction and the JALR instruction (or in the first several instruction spaces in the new routine) to insure proper execution. But, by overlaying a clear hazard indicator with the jump instruction, the present invention has allowed a programmer to insure hazards are cleared, without specific knowledge of the pipeline stages within the processor 700, or the particular hazards created by the MTC0 instruction.

Figure 8:
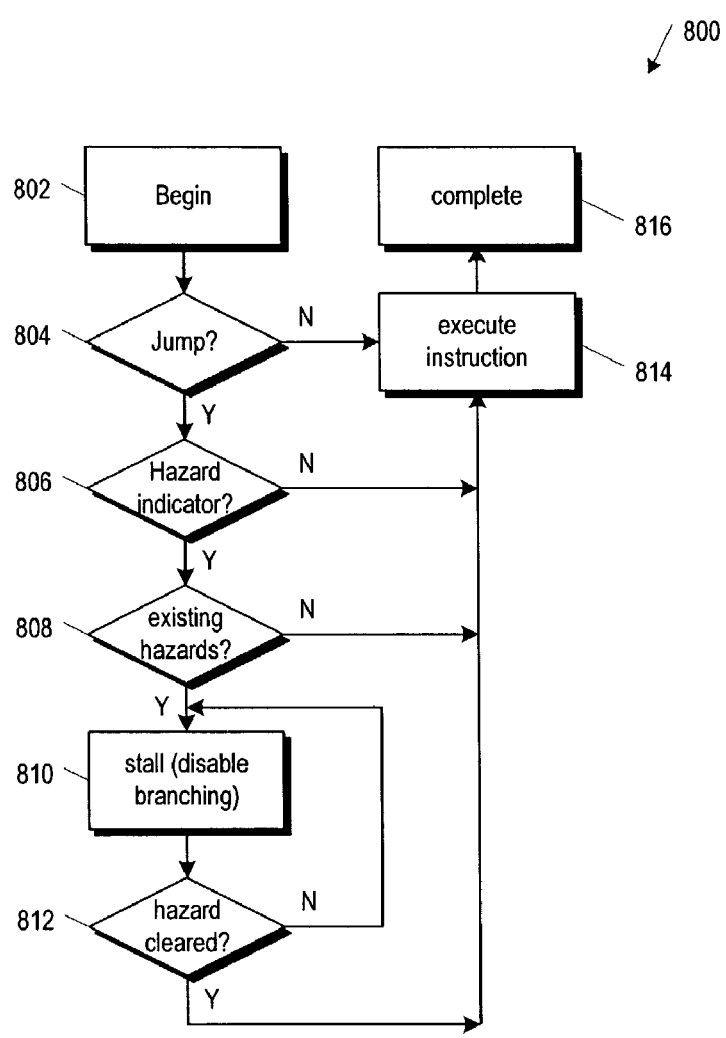
FIG. 8 is a flow chart illustrating the methodology of overlaying a jump instruction with hazard clearing according to the present invention.

Referring now to FIG. 8, a flow chart is shown that illustrates the methodology of clearing hazards according to the present invention. Flow begins at block 802 and proceeds to decision block 804.

At decision block 804, a determination is made as to whether a jump instruction is to be executed. If not, flow proceeds to block 814 where the instruction is allowed to proceed down the pipeline to execute. When the instruction has executed, flow proceeds to block 816. At block 816, the instruction has completed execution. However, if a jump instruction is to be executed, flow proceeds to decision block 806.

At decision block 806, a determination is made as to whether the jump instruction includes a hazard barrier indicator. If not, flow proceeds to block 814 where the jump instruction is allowed to proceed down the pipeline to execute as described above. However, if the jump instruction does contain a hazard barrier indicator, flow proceeds to decision block 808.

At decision block 808, a determination is made as to whether any hazard producing instructions that preceded the jump instruction are still executing in the processor. If not, flow proceeds to block 814 where the jump instruction with hazard indicator is allowed to proceed down the pipeline to execute. However, if any hazard producing instructions are still executing in the pipeline, flow proceeds to block 810.

At block 810, the jump instruction with hazard indicator is stalled for a clock cycle. Flow then proceeds to decision block 812. Note: block 810 may disable branch prediction when used in conjunction with the embodiment described with reference to FIG. 9 below.

At decision block 812, a determination is made as to whether any hazard producing instructions are still executing in the processor. If not, flow proceeds to block 814 where the jump instruction with hazard indicator is allowed to proceed down the pipeline to execute. However, if any hazard producing instructions are still executing in the pipeline, flow proceeds back to block 810. Flow continues between block 810 and decision block 812 until all hazard producing instructions in the pipeline have completed execution. Once all hazard producing instructions have completed execution, the jump instruction with hazard indicator is allowed to proceed down the pipeline.

In an alternative embodiment, rather than stalling the jump instruction with hazard indicator until all hazard producing instructions have completed execution, the inventors recognized that if they simply allow the jump instruction to proceed down the pipeline, that when the processor actually takes the jump specified by the instruction, all other stages following the jump will be flushed, as part of the jump, and execution of instructions following the jump will begin. If the jump is taken in one of the later stages in the pipeline, by the time it is taken, all hazard producing instructions will have completed execution. And, since all instructions that follow the jump are flushed, as a result of the jump, no instruction that should execute will have had time to begin execution using an incorrect state.

A problem with this approach, however, is that most modern processors, especially deeply pipelined microprocessors, utilize branch prediction mechanisms to predict the target address for the jump and begin fetching and executing instructions from the predicted target address, long before the jump instruction actually executes. A discussion of such branch prediction mechanisms is beyond the scope of this discussion. However, it should be appreciated that such mechanisms are designed to eliminate the delay associated with flushing the pipeline prior to fetching instructions at the new target address. However, if such branch prediction mechanisms are used in conjunction with a jump instruction with hazard indicator, the desired result (a flush of the pipeline) will not occur. Therefore, the inventors of the present invention utilize the hazard indicator within the jump instruction of the present invention to effectively disable instruction fetching related to a predicted target address, during the execution of the jump instruction with hazard indicator. Such an embodiment is shown in FIG. 9 to which attention is now directed.

FIG. 9 shows a pipelined microprocessor 900 similar to the one described with reference to FIG. 7. Like numbers have like references, the hundreds digit being replaced with a 9. A description of the operation of the processor 900 will now be provided using the instruction sequence provided above with reference to FIG. 7.

During a first clock cycle, an MTC0 instruction is fetched. The state change tracking logic 914 detects the MTC0 instruction as being of a type that can produce a hazard for subsequent instructions.

During a second clock cycle, the JALR.HB instruction is fetched. The jump with hazard barrier tracking logic 912 detects this instruction as a jump instruction that also wishes to clear any previous hazards. If the jump instruction did not indicate that hazards are to be cleared, the branch prediction logic 916 would cause the program counter of the processor 900 to begin fetching instructions from the predicted target address. Thus, the instructions following the jump instructions in the pipeline of the processor 900 would be the new instruction stream associated with the predicted target address, rather than the instructions that follow the jump instruction sequentially in memory. As mentioned above, normally this would be a benefit.

However, if the programmer wishes to insure that hazards are cleared as part of the jump, s/he utilizes the jump instruction with hazard clearing indicator. The jump with hazard barrier tracking logic 912 detects this desire, and if the state change tracking logic 914 indicates that a hazard producing instruction is still executing, disables the branch prediction logic 916 for the present jump. The jump is then allowed to proceed down the pipeline, followed by instructions that will ultimately be flushed out of the pipe when the jump is executed. And, as mentioned above, by the time the jump is finally executed, and the pipeline is flushed, all hazards created by the MTC0 instruction will have been cleared.

At this point, one skilled in the art should appreciate that the present invention, as described with reference to FIGS. 7–9, need not utilize the state change tracking logic 714, 914. Rather, the jump with hazard barrier tracking 712, 912 could alone specify a stall of N cycles (with reference to FIG. 7), or could disable branch prediction 916 (with reference to FIG. 9), irrespective of whether a previous instruction created a hazard. That is, where state change tracking logic is not implemented, the jump with hazard barrier tracking logic will cause the issue control to stall for n-cycles, or the branch prediction to be disabled for the present jump instruction without regard to whether hazards are presently in the pipeline of the processor. Such an embodiment would simplify implementation of the present invention, and would not require the hardware associated with tracking of hazard producing instructions. However, utilization of the state change tracking logic 714, 914 optimizes the present invention to only have effect if a hazard producing instruction is executing. Otherwise, the hazard barrier indicator will execute just like a jump instruction without a hazard barrier indicator.

Referring now to FIG. 10, a block diagram 1000 is shown of an additional instruction JR.HB for overlaying hazard clearing with a jump instruction. The JR.HB instruction is of the form JR.HB rs, and executes a branch to an instruction address specified in a register rs, and clears all execution and instruction hazards. The JR.HB instruction operates exactly like the JALR.HB instruction described above. However, rather than automatically specifying a return link address (as in the JALR.HB instruction), the programmer is given the option of specifying his own return address using another JR.HB instruction.

The above description with reference to FIGS. 4–10 have illustrated alternative embodiments and a method for overlaying a hazard clearing indicator with a jump operation. Although the present invention and its objects, features, and advantages have been described in detail, other embodiments are encompassed by the invention. In addition to implementations of the invention using hardware, the invention can be embodied in computer readable program code (e.g., software) disposed, for example, in a computer usable (e.g., readable) medium configured to store the code. The code causes the enablement of the functions, fabrication, modeling, simulation and/or testing, of the invention disclosed herein. For example, this can be accomplished through the use of computer readable program code in the form of general programming languages (e.g., C, C++, etc.), GDSII, hardware description languages (HDL) including Verilog HDL, VHDL, AHDL (Altera Hardware Description Language) and so on, or other databases, programming and/or circuit (i.e., schematic) capture tools available in the art. The code can be disposed in any known computer usable medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical or analog-based medium). As such, the code can be transmitted over communication networks including the Internet and intranets. It is understood that the functions accomplished and/or structure provided by the invention as described above can be represented in a processor that is embodied in code (e.g., HDL, GDSII, etc.) and may be transformed to hardware as part of the production of integrated circuits. Also, the invention may be embodied as a combination of hardware and code.

In addition, one skilled in the art will appreciate that the functional blocks described in FIGS. 7–9, although shown coupled to the Fetch stage of a microprocessor, could be placed together in another stage of the microprocessor, or could alternatively be separated and placed in different processing stages. That is, the Branch Prediction Logic could be located within a Fetch stage of a processor, while the jump with hazard barrier tracking could be located in a Decode stage of a processor. What is important is that the jump with hazard barrier tracking logic is able to implement the functionality of hazard clearing as part of the jump operation, as has been described above.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A pipelined microprocessor for executing an instruction to clear instruction hazards in conjunction with performing a jump, the pipelined microprocessor comprising:
   issue control, for issuing instructions to be executed by the pipelined microprocessor, said issue control having the ability to stall issuance of instructions for n-cycles upon receipt of a stall indication signal; and
   jump with hazard baffler tracking logic, coupled to said issue control, for detecting when the instruction to clear instruction hazards in conjunction with performing a jump is to be executed, and when it is, for providing the stall indication signal to said issue control;
   wherein said jump with hazard baffler tracking logic distinguishes between jump instructions that do not clear instruction hazards and the instruction to clear instruction hazards in conjunction with performing a jump.

2. The pipelined microprocessor as recited in claim 1 wherein by detecting when the instruction to clear instruction hazards in conjunction with performing a jump is to be executed, and stalling issuance of the instruction for n-cycles, all instruction hazards within the pipelined microprocessor are cleared.

3. The pipelined microprocessor as recited in claim 2 wherein the instruction hazards are cleared prior to the time a consuming instruction requires the result from a producing instruction that created a hazard.

4. The pipelined microprocessor as recited in claim 1 wherein the instruction hazards are hazards created by the instruction of a one instruction (the producer) and seen by the instruction of another instruction (the consumer).

5. The pipelined microprocessor as recited in claim 1 wherein the number of n-cycles that are stalled by said issue control depends on the number of cycles within the pipelined microprocessor required to clear all instruction hazards.

6. The pipelined microprocessor as recited in claim 1 wherein the number of n-cycles that are stalled by said issue control is predefined within said issue control.

7. The pipelined microprocessor as recited in claim 1 wherein the jump instruction to clear instruction hazards in conjunction with performing a jump comprises a hint field for designating whether instruction hazards are to be cleared.

8. A pipelined microprocessor for executing an instruction to clear instruction hazards in conjunction with performing a jump, the pipelined microprocessor comprising:
   issue control, for issuing instructions to be executed by the pipelined microprocessor, said issue control having the ability to stall issuance of instructions for n-cycles upon receipt of a stall indication signal;
   jump with hazard barrier tracking logic, coupled to said issue control, for detecting when the instruction to clear instruction hazards in conjunction with performing a jump is to be executed, and when it is, for providing the stall indication signal to said issue control; and
   state change tracking logic, coupled to said issue control, for detecting when instructions executed by the pipelined microprocessor are of a type to create instruction hazards.

9. The pipelined microprocessor as recited in claim 8 wherein said state change tracking logic tracks progress of instructions detected as being of a type that create instruction hazards.

10. The pipelined microprocessor as recited in claim 8 wherein said state change tracking logic provides a signal to said issue control when an instruction is executing within the pipelined microprocessor that is of a type that creates an instruction hazard.

11. The pipelined microprocessor as recited in claim 10 wherein said issue control stalls issuance of the instruction to clear instruction hazards in conjunction with performing a jump when it receives said signal from said state change tracking logic, and said stall indication signal from said jump with hazard barrier tracking logic.

12. The pipelined microprocessor as recited in claim 11 wherein said issue control issues the instruction to clear instruction hazards in conjunction with performing a jump when said signal from said state change tracking logic indicates that all instruction hazards are cleared.

13. A pipelined microprocessor having hazard clearing logic, the pipelined microprocessor comprising:
  branch prediction logic, for predicting a target address for causing the pipelined microprocessor to jump to said predicted target address, prior to said jump instruction completing instruction;
  jump with hazard barrier tracking logic, coupled to said branch prediction logic, for detecting when said jump instruction indicates that hazards are to be cleared, and when said jump instruction indicates that hazards are to be cleared, for signaling said branch prediction logic to disable branch prediction for said jump instruction; and
  state change tracking logic, coupled to said branch prediction logic, for determining whether instructions are executing within the pipelined microprocessor that produce instruction hazards.

14. The pipelined microprocessor as recited in claim 13 wherein said jump with hazard barrier tracking logic signals said branch prediction logic to disable branch prediction for said jump instruction whether or not an actual hazard exists within the pipelined microprocessor.

15. The pipelined microprocessor as recited in claim 13 wherein said jump instruction specifies said target address and that instruction hazards are to be cleared.

16. The pipelined microprocessor as recited in claim 13 wherein said branch prediction logic is located within a fetch stage of the pipelined microprocessor.

17. The pipelined microprocessor as recited in claim 13 wherein when said branch prediction logic is disabled for said jump instruction, it does not cause the pipelined microprocessor to jump to said predicted target address.

18. The pipelined microprocessor as recited in claim 17 wherein the pipelined microprocessor jumps to a target address specified by said jump instruction when said jump instruction completes execution.

19. The pipelined microprocessor as recited in claim 13 wherein if said state change tracking logic determines that instructions are executing within the pipelined microprocessor that produce instruction hazards, said state change tracking logic signals said branch prediction logic.

20. The pipelined microprocessor as recited in claim 19 wherein said branch prediction logic disables branch prediction for said jump instruction only if it receives said signal from said state change tracking logic.

* * * * *

UNITED STATES PATENT AND TRADEMARK OFFICE
CERTIFICATE OF CORRECTION

| | | |
|---|---|---|
| PATENT NO. | : 7,000,095 B2 | Page 1 of 1 |
| APPLICATION NO. | : 10/238993 | |
| DATED | : February 14, 2006 | |
| INVENTOR(S) | : Jeppesen et al. | |

It is certified that error appears in the above-identified patent and that said Letters Patent is hereby corrected as shown below:

Col. 12, line 9:

delete "baffler" and substitute "barrier" therefor.

Col. 12, line 14:

delete "baffler" and substitute "barrier" therefor.

Signed and Sealed this

Seventeenth Day of October, 2006

JON W. DUDAS
*Director of the United States Patent and Trademark Office*